United States Patent [19]

Torregrossa

[11] Patent Number: 5,472,567

[45] Date of Patent: Dec. 5, 1995

[54] METHOD OF CHEMICALLY REACTING A SLURRY WITH A GAS

[75] Inventor: Louis O. Torregrossa, Glens Falls, N.Y.

[73] Assignee: Kamyr, Inc., Glens Falls, N.Y.

[21] Appl. No.: 356,455

[22] Filed: Dec. 15, 1994

Related U.S. Application Data

[62] Division of Ser. No. 573,975, Aug. 28, 1990, Pat. No. 5,405,497.

[51] Int. Cl.$^6$ .......................... D21C 9/153; D21C 11/06; D21D 5/24
[52] U.S. Cl. .................. 162/6; 162/38; 162/57; 162/65; 261/122.1
[58] Field of Search .................. 261/122.1, 79.2, 261/DIG. 75; 162/29, 38, 52, 57, 65, 66, 67, 87, 63, 83, 21, 243, 4, 6, 20, 28, 82, 24; 422/224, 185

[56] References Cited

U.S. PATENT DOCUMENTS 4,279,743 7/1981 Miller ........................ 209/211
4,834,343 5/1989 Boyes ..................... 261/DIG. 75

*Primary Examiner*—Steve Alvo
*Attorney, Agent, or Firm*—Nixon & Vanderhye

[57] ABSTRACT

A number of different, efficient treatments of slurries and liquid with gas can be provided. A slurry or liquid is introduced into a first end of a vortex. A gas—such as a chemically reactive gas—is introduced from exteriorly of the vortex into contact with the slurry or liquid in the vortex, so that a desired reaction between the slurry or liquid and the gas takes place. The treated slurry or liquid is removed from the second end of the vortex while any residual or carrier gas is removed from the first end of the vortex. Gas introduction is preferably accomplished through a porous surface of revolution (e.g. cylindrical or conical) wall surrounding the vortex, the gas being in minute bubble form when it enters the slurry or liquid. This has particular applicability in the treatment of paper pulp using an ozone containing gas, or in reacting various liquids in the paper and pulp industry with gas (such as reaction of caustic solutions with chlorine or chlorine dioxide gas), the stripping of a strippable component from a liquid (e.g. stripping black liquor soap from black liquor, using air), or absorbing an absorbable component in a gas into a liquid (such as absorbing ozone, chlorine, or the like in water), or scrubbing furnace flue gases. Gas may also optionally be removed from adjacent the second end of the vortex through a separate conduit from the gas being removed from the first end of the vortex.

20 Claims, 3 Drawing Sheets

5,472,567

METHOD OF CHEMICALLY REACTING A SLURRY WITH A GAS

This is a divisional of application Ser. No. 07/573,975, filed Aug. 28, 1990 now U.S. Pat. No. 5,405,497 issued Apr. 11, 1995.

BACKGROUND AND SUMMARY OF THE INVENTION

There are many processes In industry in which it is desirable to "react" (chemically or physically) a slurry or a liquid with a gas. Of course most of such processes differ significantly in detail, but many processes have in common the desire to provide intimate contact between the gas and the slurry particles, or the liquid, and at a rapid rate. Rapid intimate contact results in the most effective reactions, and the fastest reaction rate, both desirable goals.

According to the present invention, these desirable goals are achieved for a wide variety of reactions between gases and liquids or slurries. According to the invention, gas is introduced into the liquid or slurry while it is in a vortex which may be, but is not necessarily, a vertical axis vortex, preferably in the form of small bubbles. The small bubbles—having a very high surface area to volume ratio—encounter a high pseudo-gravitational field generated by the rotation of the slurry or liquid in the vortex, and under the influence of the field the bubbles move toward the center of the vortex. Mass transfer from the bubbles through the air/liquid interface, through the liquid medium, into reaction sites on the solids surface (in a slurry), or to reaction sites on the liquid itself, is very rapid. It is rapid due to the large interfacial area, high degree of agitation due to rapid and continuous movement of the bubbles through the shear planes formed by the liquid phase in the vortex, the large number of bubbles, and the close proximity between gas bubbles and solid particles or reactant liquid. Gas (if any) to be discharged after the reaction is removed from the top portion of the vortex (if vertical), while the treated slurry or liquid is removed from the bottom of the vortex (if vertical). Under some circumstances, gas can also be removed from liquid adjacent the bottom of the vortex.

Typical processes to which the general method according to the invention is applicable include effecting chemical treatment of solids in a slurry with a gas chemically reactive with the slurry solids, chemically reacting a liquid with a gas, stripping a strippable component from a liquid utilizing a stripping gas, and absorbing a gas with an absorbable component in an absorbent liquid. In each case it is desirable to utilize a gas porous surface of revolution (e.g. cylindrical or conical) wall surrounding the vortex, and to practice the step of introducing the reactive gas into contact with the slurry or liquid through the gas porous wall.

A particular method of effecting chemical treatment of solids in a slurry with a gas reactive with the slurry solids, according to the invention, is treating paper pulp (comminuted cellulosic fibrous material slurry) with an ozone containing gas, such as ozone mixed with oxygen containing gas. The slurry may be introduced at a pressure of about 10–30 psig, while the gas is introduced at a pressure of about 2–10 psig. The gas porous wall may have pores with a pore size of 1–200 microns. Typically the slurry of comminuted cellulosic fibrous material has a solids concentration of about 1–3%. The residual gas removed may be acted upon to separate entrained droplets from the gas, condensing the gas to remove water vapor, effecting catalytic conversion to remove entrained reactant byproduct gases, effecting absorption to remove reactant byproduct gases, or generating ozone by passing the residual gas through an ozone generator. After discharge the slurry may be deaerated. Two or more vortices may be provided in series, with the pulp discharged from the first being fed to the inlet of the second, and with the residual gas withdrawn from the second being fed to the first as the reactant gas.

Chemical reaction between a slurry and gas may also be provided, according to the invention, by scrubbing flue gas having sulfur compounds or nitrous oxides with a calcium carbonate slurry. In such a case a series of vortices is typically provided, the first vortex (as far as flue gas flow is concerned) having a large pore gas porous wall (e.g. about 1–5 mm).

For that aspect of the invention in which a liquid is reacted with a gas, various liquids and gases typically used in the pulp and paper making field are particularly suitable, although the invention has much wider applicability. For example chlorine or chlorine dioxide gases can be reacted with caustic solutions, sulfur dioxide solution, or spent alkaline bleaching plant liquor during the scrubbing of a bleach plant exhaust. Air or oxygen can be used to oxidize kraft mill white, green, or black liquors.

The invention is applicable to a wide variety of liquid components strippable from a liquid, utilizing a stripping gas. For example water vapor may be stripped from hot or warm water using air, to produce cooler water. Black liquor soap may be stripped from black liquor using air.

The practice of the method according to the invention for absorbing a gas with an absorbable component in an absorbing liquid also has wide applicability, including in the pulp and paper field. For example the invention may be practiced to effect condensation, or to dehumidify air by the contact of warm water vapor and air by cooler water. Mists of various types, such as sulfuric acid droplets, may be absorbed in water or other solvents, and water or other desirable liquids can be utilized to absorb ozone, chlorine, chlorine dioxide, sulfur dioxide, carbon dioxide, or ammonia gases (either by themselves, or mixed with air or other gases ) .

In all of the methods according to the invention, additives may be also added either to promote reactions (e.g. the addition of catalysts), or to promote mass transfer (e.g. surface active agents to improve bubble stability).

It is the primary object of the present invention to provide for the effective mixing of gas in a slurry or liquid, to produce a wide variety of desirable end results such as chemical reaction, stripping, absorbing, or the like. This and other objects of the invention will become clear from an inspection of the detailed description of the invention, and from the appended claims.

DETAILED DESCRIPTION OF THE DRAWINGS

Figure 1:
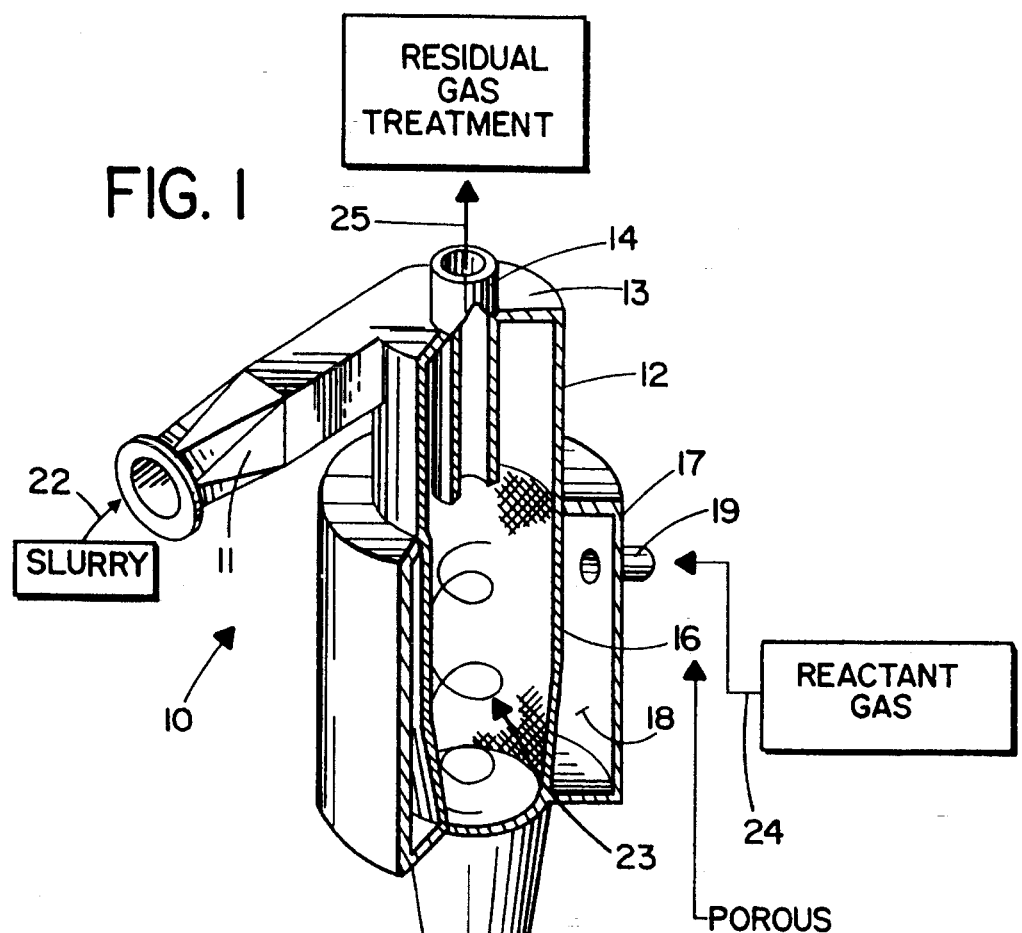
FIG. 1 is a schematic perspective view, with portions cut away to illustrate the interior, of an exemplary apparatus for effecting chemical treatment of solids in a slurry with a gas reactive with the slurry solids.

An exemplary apparatus 10 for practicing a method of effecting chemical treatment of solids in a slurry with a gas chemically reactive with the slurry solids is illustrated generally by reference 10 in FIG. 1. The apparatus per se, and various modifications thereof, is shown in U.S. Pat. Nos. 4,399,027, 4,279,743, and 4,838,434, the disclosures of which are hereby incorporated by reference herein. The apparatus in these patents is specifically utilized therein for the separation by flotation of particles from a liquid, in particular for separating mining particles from a liquid entraining the particles, and use thereof for the advantageous methods according to the invention has not heretofore been known.

The most significant components of the device 10 comprise the slurry inlet 11, a main body or vortex chamber 12 having a top 13, a gas outlet 14 from the center of the top 13, a gas porous wall 16 of the body 12 surrounded by another, solid, wall 17 to define a gas filled chamber 18 therebetween, with an inlet 19 for gas into the chamber 18, and a slurry discharge 20 from the bottom of the body 12. The slurry is introduced at 22 into the inlet 11, and the slurry forms a vortex—illustrated generally by reference numeral 23—within the volume defined by the elements 12, 16. While the vortex is described herein as being a generally vertical axis vortex, it is to be understood that the axis may normally have any orientation; therefore the terms "top" and "bottom" as used in this specification and claims are to be understood to be relative to the liquid or slurry inlet and outlet only, not to the orientation of the vortex axis, except where specifically described otherwise.

According to one aspect of the invention, after the introduction of the slurry into the vortex 23, a gas chemically reactive with the slurry solids is introduced at 24 into the chamber 18, passing through the porous wall 16 so that it is divided into minute gas bubbles which come in contact with the slurry in the vortex 23. While a wide variety of gas porous walls 16 may be utilized, it is desired that one having a pore size of about 1–200 microns be utilized for some applications (e.g. ozone treatment of pulp). The wall 16 preferably is a surface of revolution, such as a cone or a cylinder. Any residual gas, or carrier gas for the reactant gas introduced at 24, is removed at 25 from the top 13 of the device 10, preferably from the central portion of the top. The slurry that is discharged is discharged at 26, and passes to further slurry treatment stages.

One particular method within the general process according to the invention, that is particularly applicable, is the treatment of a comminuted cellulosic fibrous material slurry (paper pulp) with an ozone containing gas, such as ozone mixed with oxygen or air. The slurry is introduced at 22 with a solids concentration of about 1–3% and at a pressure of about 10–30 psig. The ozone, or ozone/oxygen mixture, is introduced at 24 at a pressure of about 2–10 psig. Typically the slurry 22 should have a pH in the range of about 2–7 (preferably about 4–5), and the temperature during the practice of the method should be about 25°–75° C. (preferably about 35°–45° C.). A wide variety of cellulosic fibrous materials may be utilized, such as either virgin fiber or recycled fiber kraft, TMP, sulfite, or CTMP pulps.

It is also desirable to act on the residual carrier gas discharged at 25. For example entrained droplets may be separated from the residual gas, the residual gas may be condensed to remove water vapor, catalytic conversion may be practiced to remove entrained reactant byproduct gases, reactant byproducts may be removed from the residual gas by absorption, or the residual gases at 25 may be passed through an ozone generator, and ozone generated thereby.

Figure 2:
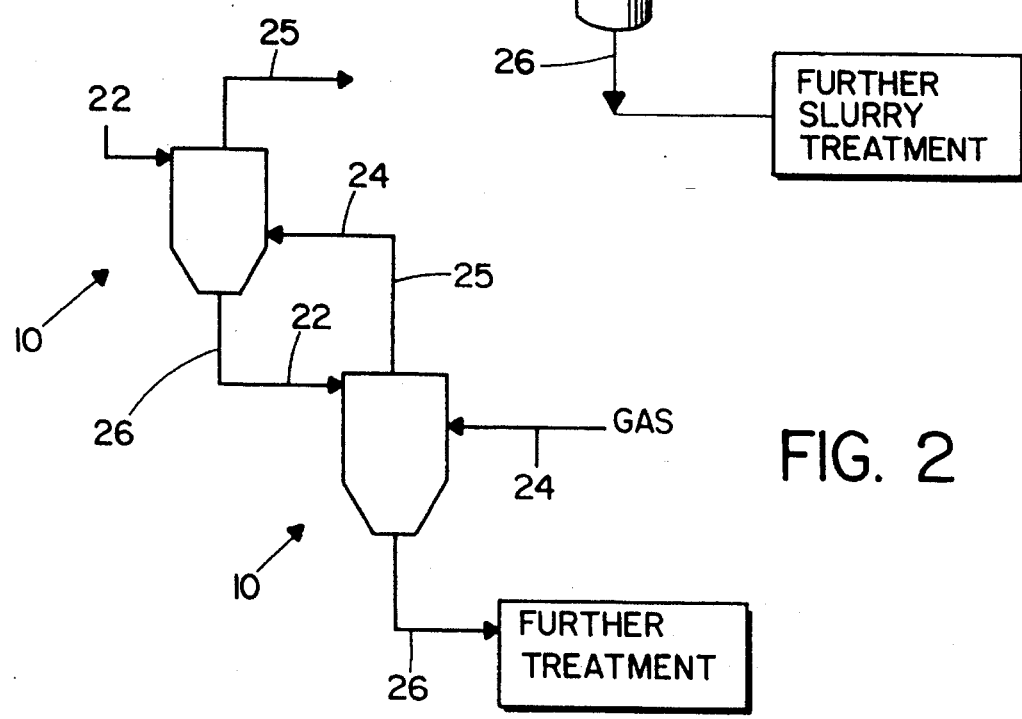
FIG. 2 is a schematic illustration of the interconnection of two of the structures such as illustrated in FIG. 1.

In order to improve reaction efficiency, it may be desirable—as illustrated in FIG. 2—to interconnect two (or more) of the devices 10, to provide first and second (or subsequent) vortices, with the flows between the vortices interconnected as illustrated in FIG. 2. Note that in FIG. 2 the slurry discharged at 26 from the first device 10 comprises the feed slurry 22 for the second device 10, while the discharged gas at 25 from the second device 10 comprises the reactant feed gas 24 for the first device 10. By using the gas—particularly ozone gas—in 24 twice, greater efficiency can be obtained. The FIG. 2 embodiment is not restricted to chemically treating pulp, but can be used for any of the embodiments according to the invention.

Other specific examples of the treatment of solids in a slurry with reactive gas are the bleaching of pulp utilizing gaseous chlorine dioxide (mixed with air, or pure), and the treatment of flue gases from furnaces, e.g. those burning sulfur containing compounds, or high temperature furnaces. In the treatment of flue gases, a calcium carbonate slurry would be introduced at 22 and the flue gas—typically containing sulfur dioxide or nitrous oxides—are introduced at 24. In such a situation, the wall 16 is very porous, having relatively large holes, for example on the order of about 1–5 millimeters (e.g. a pipe with drilled holes). If a number of such devices are utilized in series (such as illustrated in FIG. 2, with the gas discharge 25 from one of the devices feeding back to the next earliest device in the series as the gas feed 24), the succeeding devices have smaller pores or holes than the first (when viewing the series from the standpoint of raw gas introduction).

Basically the same elements as illustrated in FIGS. 1 and 2 may be utilized in the method according to the present invention of reacting a liquid with a gas. In the practice of such a method, liquid would be introduced at 22 instead of slurry, and would be withdrawn at 26. Residual or carrier gas would be withdrawn at 25, and chemically reactant gas introduced at 24. Again, typical pressures for the introduction of the liquid at 22 would be about 10–30 psig, while the typical pressure for the introduction of gas at 24 would be about 2–10 psig, however under certain circumstances the pressure and temperature may vary widely.

For this aspect of the invention, various liquids and gases typically used in the pulp and paper making field are particularly suitable, although the invention has wider applicability. For example chlorine or chlorine dioxide gases can be reacted with caustic solutions, sulfur dioxide solution, or spent alkaline bleaching plant liquor during the scrubbing of a bleach plant exhaust. Air or oxygen can be used to oxidize kraft mill white, green, or black liquors.

Figure 3:
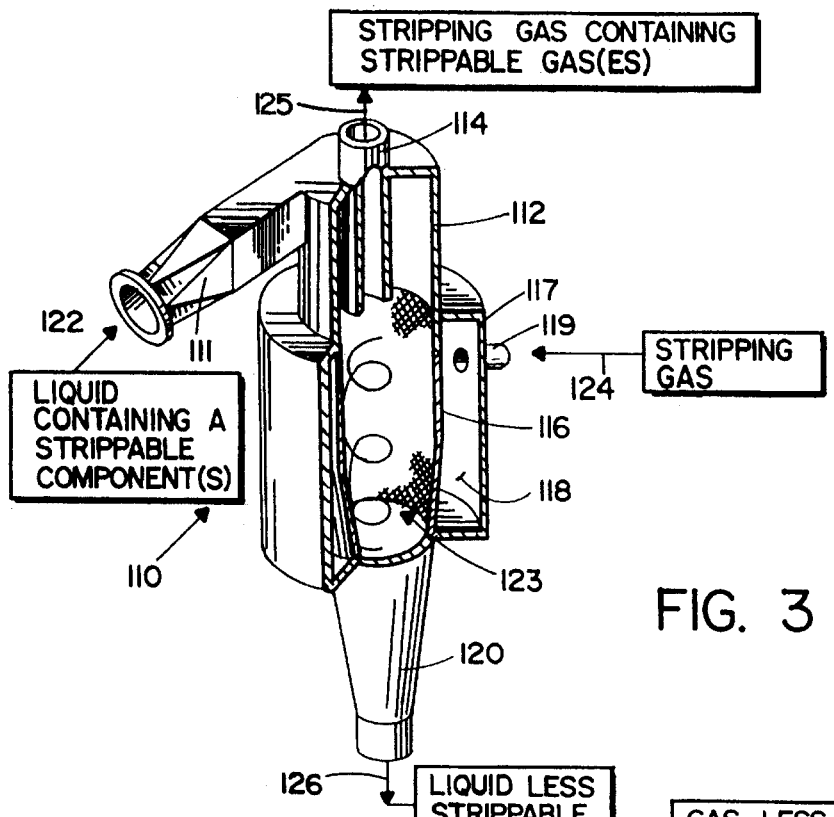
FIG. 3 is a view like that of FIG. 1 for a method of stripping a strippable component from a liquid utilizing a stripping gas.

FIG. 3 schematically illustrates a device for practice of another method according to the invention, in which a strippable component of a liquid is stripped utilizing a stripping gas. In this embodiment components of the drawing of FIG. 3 comparable in general function to those illustrated in FIG. 1 are shown by the same reference numeral only preceded by a "1"

In the practice of the method schematically illustrated with respect to FIG. 3, the liquid with strippable component is introduced at 122 into a first end of vortex 123. Stripping gas is introduced, from exteriorly of the vortex, at 124 into contact with the liquid in the vortex 123, the stripping gas and liquid strippable component reacting. The stripping gas passing through the porous surface of revolution wall 116 will be in the form of very small bubbles, providing a high surface area to volume ratio and thereby facilitating mass transfer, and reaction time. The liquid, minus the strippable component, is discharged at vortex second end 126.

A specific example of components which could be utilized in the practice of the method schematically illustrated in FIG. 3 is the stripping water vapor from hot or warm water with air (or another gas having a cooler temperature), to produce cooler water. That is warm or hot water (e.g. with water vapor) enters at 122, while cooler air would enter at 124. The water vapor and air exit at 125, while the cooler liquid exits at 126.

Another example is the removal of black liquor soap from black liquor (waste liquor from kraft pulping of comminuted cellulosic fibrous material) with air. Black liquor soap in the black liquor introduced at 122 would foam, and would be withdrawn in the "gas phase" at 125. The black liquor would also be simultaneously oxidized by the air. The "soap" could be removed by a stripping gas which did not have oxygen.

Another specific utilization of the method schematically illustrated in FIG. 3 would be the stripping of methanol, turpentine, or the like from black liquor with steam, air, or a mixture of steam and air.

Figure 4:
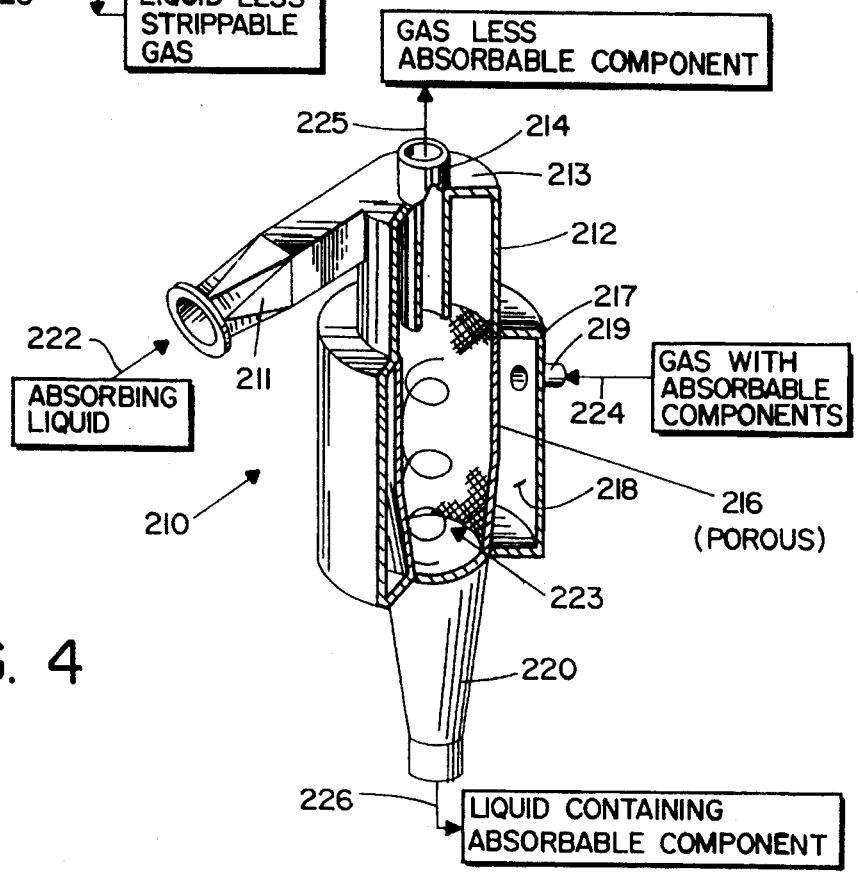
FIG. 4 is a view like that of FIG. 1 only for absorbing a gas with an absorbable component in an absorbing liquid.

FIG. 4 illustrates schematically the aspect of the present invention relating to the method of absorbing a gas with an absorbable component in an absorbing liquid. In this embodiment components of the drawing of FIG. 4 comparable in general function to those in FIG. 1 are shown by the same reference numeral only preceded by a "2"

The absorbing (or dissolving or chemically reacting) liquid is introduced at 222 into the vortex 223. From exteriorly of the vortex 223, the gas with an absorbable component is introduced at 224, passing through the porous wall 216, to go into contact with the liquid in the vortex so that the absorbable gas component is absorbed by the absorbing liquid. The liquid containing the absorbable component is removed at 226 from the bottom of the vortex 223, while residual gas without the absorbable component (or components, or certainly a reduced value thereof) is removed from the top portion of the vortex at 225.

Specific practice of the absorbing method according to the invention includes the following specific examples: Gases containing a wide variety of components in water or another suitable liquid could be absorbed, that is the device 210 could act as a condenser. Warm water vapor could be introduced at 224 and relatively cool water at 222, the water dehumidifying the gas as it is discharged at 225. Mists could be absorbed in water or other solvents, for example sulfuric acid mist may be introduced at 224 and absorbed in water introduced at 222. Ozone, chlorine, chlorine dioxide, sulfur dioxide, carbon dioxide, or ammonia gases (with or without air or other gases), etc., could be absorbed in water or other desirable liquid.

Figure 5:
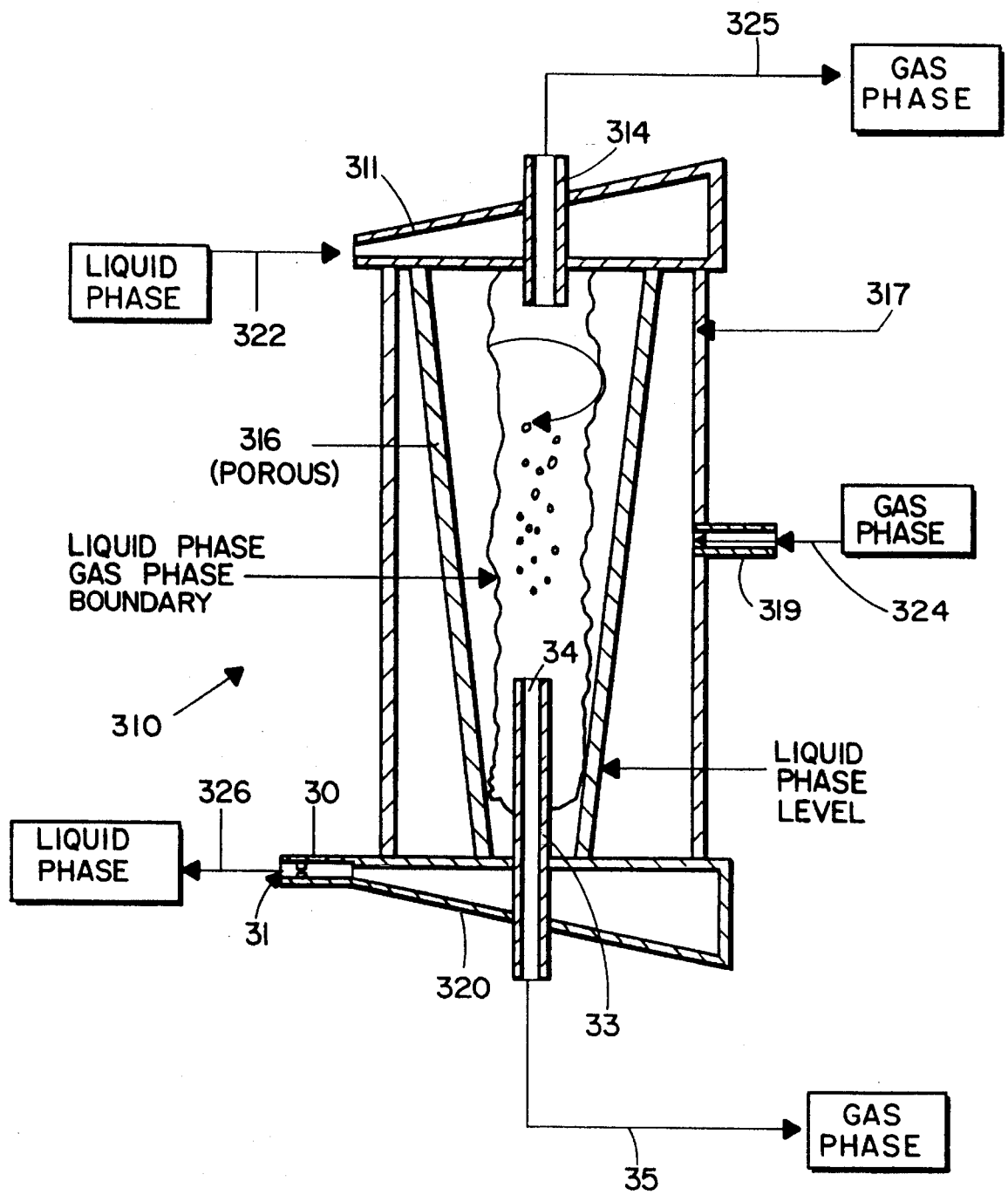
FIG. 5 is a side cross-sectional schematic view of a modified form of apparatus for treating a liquid with a gas according to the methods of the present invention.

FIG. 5 illustrates a slightly different apparatus 32. In this embodiment, too, however, components and flows generally comparable to those in the FIG. 1 embodiment are shown by the same reference numeral only preceded by a "3" In this embodiment, note that the wall 316 is conical rather than primarily cylindrical. In this device there also is provided an outlet conduit 30 for the liquid phase in 326, the outlet conduit 30 having a flow control orifice or valve 31 therein. Also in this embodiment some of the gas phase may be withdrawn from adjacent the bottom of the device 310, rather than all of it through 314. In this regard a conduit 33 having a free end 34 thereof extends upwardly into the gas phase within the interior of the vortex 323, the gas phase being withdrawn at 35 (the second, or bottom end of the vortex). This embodiment may be utilized to practice any of the other specific methods described earlier.

In all of the methods according to the invention, additives may be also added either to promote reactions (e.g. the addition of catalysts), or to promote mass transfer (e.g. surface active agents to improve bubble stability).

It will thus be seen that according to the present invention effective methods have been provided for chemical treatment of solids in a slurry with a gas reactive with the slurry solids, reacting a liquid with a gas, stripping a strippable component from a liquid utilizing a stripping gas, and absorbing a gas with an absorbable component in an absorbing liquid. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass .all equivalent methods and procedures.

What is claimed is:

1. A method of effecting chemical treatment of solids in a slurry with a gas chemically reactive with the slurry solids, in a vessel having an elongated surface of revolution with a first and second end, and a central comprising the stops of:

(a) the slurry into the first end of the vessel off center of the central axis to establish a vortex;

(b) introducing chemically reactive gas from exteriorly of the vortex into contact with the slurry in the vortex, the slurry solids and the gas chemically reacting in the vortex;

(c) removing treated slurry from the second end of the vessel and vortex, opposite the first end; and (d) removing any residual gas from the first end of the vessel and vortex.

2. A method as recited in claim 1 wherein step (b) is practiced using a carrier gas, and wherein step (d) is practiced to remove any residual and carrier gas.

3. A method as recited in claim 1 utilizing a gas porous surface of revolution wall surrounding the vortex, and wherein step (b) is practiced by introducing gas through the gas porous wall so that the gas is in minute bubble form when it enters the slurry.

4. A method as recited in claim 3 wherein step (a) is practiced by using a comminuted cellulosic fibrous material slurry.

5. A method as recited in claim 4 wherein step (b) is practiced by adding ozone containing gas to react with the material of the slurry, and wherein step (a) is practiced so that the pH of the slurry is in the range of about 2–7, and wherein all of said steps are practiced at a temperature of about 25°–75° C.

6. A method as recited in claim 5 wherein step (b) is further practiced by introducing the ozone mixed with oxygen containing gas.

7. A method as recited in claim 6 comprising the further step (e) of acting on the residual gas from step (d) to change the composition thereof.

8. A method as recited in claim 7 wherein step (e) is practiced by a step selected from the group consisting of separating entrained droplets from the reactant gas, condensing the gas to remove water vapor, effecting catalytic conversion to remove entrained reactant byproduct gases, effecting absorption to remove reactant by product gases, and generating ozone by passing the residual gas through an ozone generator.

9. A method as recited in claim 4 wherein step (a) is practiced at a pressure of about 10–30 psig, and step (b) is practiced at a pressure of about 2–10 psig.

10. A method as recited in claim 3 wherein step (b) is further practiced by providing the gas porous wall with pores having a pore size of about 1–200 microns.

11. A method as recited in claim 4 wherein step (a) is further practiced by providing the comminuted cellulosic fibrous material slurry at a solids concentration of about 1–3%.

12. A method as recited in claim 4 comprising the further step (f) of deaerating the slurry from step (c), and wherein the vortex has a generally vertical axis.

13. A method as recited in claim 5 wherein step (a) is further practiced by providing the slurry material from the group consisting of virgin kraft pulp, recycled kraft pulp, TMP, sulfite pulp, and CTMP.

14. A method as recited in claim 13 wherein step (a) is further practiced by providing the comminuted cellulosic fibrous material slurry at a solids concentration of about 1–3%.

15. A method as recited in claim 5 comprising the further steps of: (e) passing the slurry from the second end of the vortex to the first end of a second vortex; (f) introducing ozone containing gas to react with the material of the slurry in the second vortex; (g) removing the treated slurry from the second end of the second vortex; and (h) passing residual gas from the first end of the second vortex to be introduced into the vortex in step (b).

16. A method as recited in claim 1 comprising the further steps of: (e) passing the slurry from the second end of the vortex to the first end of a second vortex; (f) introducing gas to react with the material of the slurry in the second vortex; (g) removing the treated slurry from the second end of the second vortex; and (h) passing residual gas from the first end of the second vortex to be introduced into the vortex in step (b).

17. A method as recited in claim 1 wherein step (a) is practiced by using a comminuted cellulosic fibrous material slurry at a solids concentration of about 1–3%.

18. A method as recited in claim 17 wherein step (a) is further practiced by providing the slurry material from the group consisting of virgin kraft pulp, recycled kraft pulp, TMP, sulfite pulp, and CTMP.

19. A method as recited in claim 17 wherein step (b) is practiced by adding ozone containing gas to react with the material of the slurry, and wherein step (a) is practiced so that the pH of the slurry is in the range of about 2–7, and wherein all of said steps are practiced at a temperature of about 25°–75° C.

20. A method as recited in claim 19 comprising the further steps of: (e) passing the slurry from the second end of the vortex to the first end of a second vortex; (f) introducing ozone containing gas to react with the material of the slurry in the second vortex; (g) removing the treated slurry from the second end of the second vortex; and (h) passing residual gas from the first end of the second vortex to be introduced into the vortex in step (b).

* * * * *